United States Patent Office — 2,992,202, Patented July 11, 1961

2,992,202
VULCANIZABLE HALOGENATED BUTYL RUBBER COMPOSITION CONTAINING MERCAPTOBENZOTHIAZOLE AND PROCESS OF VULCANIZING SAME

Theodore Lemiszka, Roselle, Leon S. Minckler, Jr., Metuchen, and Delmer L. Cottle, Highland Park, N.J., assignors to Esso Research and Engineering Company, a corporation of Delaware
No Drawing. Filed Oct. 29, 1958, Ser. No. 770,265
17 Claims. (Cl. 260—41.5)

This invention relates to rubbery polymeric compositions which are halogenated copolymers of isoolefins and multiolefins, to the preparation and vulcanization of such compositions, and especially to improved methods for curing halogenated butyl rubber in the absence of added sulfur or zinc oxide with minor proportions of mercaptobenzothiazole or its derivatives.

Copolymers of the above general type, especially where the copolymer contains about 85 to 99.5% (preferably about 95 to 99.5%) of a $C_4$ to $C_7$ isoolefin such as 2-methyl-1-butene, 3-methyl-1-butene or especially isobutylene with about 15 to 0.5% (preferably 5 to 0.5 weight percent) of a multiolefin of about 4 to 14, preferably about 4 to 6, carbon atoms and having a Staudinger molecular weight of between about 20,000 and 300,000, are commonly referred to in patents and in literature as "butyl rubber" or GR–I rubber (Government rubber-isobutylene) and, for example, is referred to as "butyl rubber" in textbook "Synthetic Rubber" by G. S. Whitby. The preparation of butyl type rubber is also described in U.S. Patent 2,356,128 to Thomas et al. In general, the multiolefinic component of the rubber comprises such multiolefins as myrcene, allo-ocimene, dimethallyl or preferably a conjugated diolefin such as isoprene, butadiene, dimethyl butadiene, piperylene, etc. The reaction product of isobutylene and isoprene is preferred. Butyl rubber preferably has a mole percent unsaturation of between about 0.5 to 10.0.

Halogenated butyl-type rubbery copolymers, which are vulcanizable with zinc oxide alone and completely covulcanizable with more highly unsaturated rubbers into desirable materials of high tensile strength, are produced by halogenating the butyl rubber in a manner which does not appreciably degrade the molecular weight thereof, but with sufficient halogen to produce a rubbery product which, when vulcanized by sulfur, retains its tensile strength upon heat aging. Such halogenated butyl rubbers are readily covulcanizable with more highly unsaturated rubbers, for example by means of added sulfur, to produce rubbery products of excellent heat aging resistance since halogenated butyl rubbers do not greatly differ in curing rate as compared to natural rubber and synthetic rubbers such as GR–S rubber. The sulfur cures may optionally also be in the presence of basic metal oxides such as zinc oxide and accelerators.

It has now been discovered that halogenated butyl rubber may be vulcanized effectively in the absence of either added elemental sulfur or zinc oxide solely by mercaptobenzothiazole or such derivatives of mercaptobenzothiazole as groups I to VIII (preferably groups I, II, III, IV, V, VI or VII) metal salts of mercaptobenzothiazole; oxidized mercaptobenzothiazoles such as di-2-benzothiazyl disulfide and heterocyclic derivatives of mercaptobenzothiazole containing nitrogen and sulfur such as 2-mercapto-thiazoline. Typical mercaptobenzothiazole compounds, useful for the purpose of the present invention, include among others:

2-mercaptobenzothiazole,
di-2-benzothiazyl disulfide,
2-mercapto-thiazoline,
zinc 2-mercaptobenzothiazole,
cupric 2-mercaptobenzothiazole,
sodium 2-mercaptobenzothiazole,
bismuth 2-mercaptobenzothiazole,
iron 2-mercaptobenzothiazole,
tin 2-mercaptobenzothiazole,
chromium 2-mercaptobenzothiazole,
lead 2-mercaptobenzothiazole, and
aluminum 2-mercaptobenzothiazole.

In practicing the present invention, 100 parts by weight of halogenated butyl rubber are compounded in the absence of either added elemental sulfur or metal oxides with about 0.1 to 30, advantageously about 0.3 to 20, and preferably about 0.5 to 15.0 parts by weight of one or more compounds comprising mercaptobenzothiazole and/or its derivatives. To this foregoing composition is also preferably added about 20 to 100 parts by weight of a filler such as clays or carbon blacks, with the optional addition of such conventional compounding agents as antioxidants such as phenyl beta-naphthylamine, antitack agents such as stearic acid, resins, plasticizers, etc. The resulting compounded stock is then cured by heating the same for about 0.5 minute to 5 hours, preferably for about 2 minutes to 2 hours at a temperature level of between about 150° to 450° F., advantageously at about 200° to 400° F., and preferably at about 250° to 375° F. to produce a vulcanizate having excellent tensile strength, modulus, and elongation.

In producing halogenated butyl rubber to be vulcanized in accordance with the present invention, unmodified, unvulcanized butyl rubber is carefully halogenated so as to contain about at least 0.5 weight percent (preferably at least about 1.0 weight percent) combined halogen but not more than about "X" weight percent combined chlorine or 3X weight percent combined bromine wherein:

$$X = \frac{M_3 L}{(100 - L)M_1 + L(M_2 + M_3)} \times 100$$

and:

$L$ = mole percent of the multiolefin in the polymer
$M_1$ = molecular weight of the isoolefin
$M_2$ = molecular weight of the multiolefin
$M_3$ = atomic weight of chlorine or bromine Restated, there should be at least about 0.5 weight percent of combined halogen in the polymer but not more than about one atom of chlorine or three atoms of bromine combined in the polymer per molecule of multiolefin present therein; i.e., not more than about one atom of combined chlorine or three atoms of combined bromine per double bond in the polymer.

Suitable halogenating agents which may be employed are gaseous chlorine, liquid bromine, alkali metal hypochlorites, sodium hypobromite, $C_4$ to $C_{10}$ tertiary alkylhypochlorites or hypobromites, sulfur chlorides or bromides (particularly oxygenated sulfur chlorides or bromides), N-bromo-succinimide, iodine monochloride, N-chloroacetanilide, tri-bromophenol bromide, N-chloroacetamide, N,N'-dimethyl-5,5 dichloro or dibromo hydantoin, and other common halogenating agents.

The halogenation is generally conducted at about 0° to about +200° C., advantageously at about 10° to 65° C., preferably at about 20° to 50° C. (room temperature generally being satisfactory), depending upon the particular halogenation agent, for about one minute to several hours. An advantageous pressure range is from about 0.5 to 400 p.s.i.a.; atmospheric pressure being satisfactory. The halogenation conditions are regulated to halogenate the rubbery copolymer to the extent above-mentioned.

The halogenation may be accomplished in various ways. One process comprises preparing a solution of the copolymer as above, in a suitable inert liquid organic solvent such as a $C_3$ to $C_{10}$ or preferably a $C_5$ to $C_8$ inert hydrocarbon or halogenated derivatives of saturated hydrocarbons, examples of which are hexane, heptane, naphtha, mineral spirits, cyclohexane, alkyl substituted cycloparaffins, benzene, chlorobenzene, chloroform, trichloroethane, carbon tetrachloride, mixtures thereof, etc., and adding thereto gaseous chlorine, liquid bromine, or other halogenating agent, which may optionally be in solution, such as dissolved in any inert hydrocarbon, an alkyl chloride, carbon tetrachloride, etc.

dried and analyzed and found to have a viscosity average molecular weight of 320,000 and to contain 1.4% chlorine based on the polymer. The physical characteristics of both zinc oxide and diamine-cured vulcanizates, containing this chlorinated interpolymer, were excellent.

HALOGENATED RUBBERS "B" TO "L"

Other examples of halogenated isoolefin-multiolefin copolymers which can be used are tabulated hereinafter, the amount of isoolefin and multiolefin in copolymer, halogenation agent, and amount of halogen combined in the copolymer being as follows:

| Halogenated rubber | Isoolefin, percent by weight | Multiolefin, percent by weight | Halogenation agent | Percent by weight halogen in the rubber |
|---|---|---|---|---|
| B | Isobutylene, 98 | Isoprene, 2 | $SO_2Cl_2$ | 1.2 chlorine. |
| C | Isobutylene, 95 | Isoprene, 5.0 | $Cl_2$ in $CCl_4$ | 2.5 chlorine. |
| D | Isobutylene, 94 | Cyclopentadiene, 6 | $Cl_2$ in $CCl_4$ | 2.0 chlorine. |
| E | Isobutylene, 92 | Myrcene, 8.0 | $Cl_2$ in $CCl_4$ | 1.6 chlorine. |
| F | 2-methyl-butene-1, 95 | Isoprene, 5 | $Cl_2$ in hexane | 1.5 chlorine. |
| G | 3-methyl-butene-1, 96 | Butadiene, 4 | ----do---- | 1.9 chlorine. |
| H | Isobutylene, 98 | 1-vinyl cyclohexene-3, 2 | $Cl_2$ in $CCl_4$ | 0.8 chlorine. |
| I | Isobutylene, 92 | Butadiene, 8 | Gaseous chlorine | 2.8 chlorine. |
| J | Isobutylene, 85 | Isoprene, 15 | ----do---- | 6.6 chlorine. |
| K | Isobutylene, 98 | Isoprene, 2 | N,N'-dichloro-5,5-dimethyl hydantoin. | 1.1 chlorine. |
| L | ----do---- | ----do---- | Liquid bromine | 2.3 bromine. |

The concentration of the butyl rubber in the solvent will depend upon the type of reactor, molecular weight of the butyl rubber, etc. In general, the concentration of a butyl rubber having a viscosity average molecular weight of about 200,000 to about 1,500,000, if the solvent is a substantially inert hydrocarbon, will be between 1 and 30% by weight, preferably about 5 to 20%. If chlorine gas is employed to chlorinate such a rubbery solution, it may also be diluted with up to about 50 times its volume, preferably about 0.1 to 5.0 times its volume of an inert gas such as nitrogen, methane, ethane, carbon dioxide, etc.

The resulting halogenated butyl rubber polymer may be recovered in various manners. The halogenated polymer may be precipitated with acetone or any other known non-solvent for the halogenated butyl rubber and dried under about 1 to 760 millimeters or higher of mercury pressure absolute at about 0° to 180° C., preferably at about 50° to 150° C. (e.g. 70° C.). Other methods of recovering the halogenated butyl rubber poymer from the hydrocarbon solution of the same are by conventional spray or drum drying techniques. Alternatively the halogenated butyl rubber-containing solution may be injected into a vessel containing agitated water heated to a temperature sufficient to flash off the hydrocarbon solvent and form an aqueous slurry of the halogenated butyl rubber. The halogenated butyl rubber may then be separated from this slurry by filtration, dried and recovered as a "crumb" or as a dense sheet or slab by conventional milling and/or extruding procedures. The halogenated copolymer formed advantageously has a viscosity average molecular weight between about 200,000 and 2,500,000 and a mole percent unsaturation of between about 0.5 to 15.0, preferably about 0.6 to 5.0.

In order to more fully illustrate the present invention, the following experimental data are given:

CHLORINATED BUTYL RUBBER "A"

A copolymer of about 97% isobutylene and 3% isoprene having a viscosity average molecular weight of 320,000 was dissolved in hexane to form a 10% solution. To this polymer solution, 20 weight percent (based on the polymer) of liquid sulfuryl chloride as the chlorinating agent was added and reacted for 30 minutes with the polymer at room temperature. The resulting chlorinated copolymer was precipitated with acetone, collected and redissolved in hexane three times and ultimately

CHLORINATED BUTYL RUBBER "M"

An additional run was made chlorinating a commercial butyl rubber dissolved in benzene. The butyl rubber had a Mooney viscosity at 212° F. for 8 minutes of 75, and a mole percent unsaturation of 1.6. The chlorination of a solution of the uncured butyl rubber was conducted in a 500-gallon glass-lined Pfaudler reactor equipped with an agitator, baffle, submersed stainless steel sparger ring and a conduit leading into the ring.

Gaseous chlorine was continuously added to the butyl rubber solution over a period of one-half hour at a temperature level of 30° C. and under atmospheric pressure. The chlorine was added to the reactor through the conduit via the sparger ring. The chlorination was then terminated and the solution containing the chlorinated butyl rubber formed was agitated for an additional 20 minutes. The resulting solution of chlorinated butyl rubber was then water washer three times to remove dissolved hydrogen chloride.

The absolute amount of butyl rubber, benzene solvent and gaseous chlorine added, as well as the calculated percent of added chlorine based on polymer and resulting percent of chlorine combined in the polymer were as follows:

|  | Pounds | Percent in composition |
|---|---|---|
| Butyl rubber | 170 | 98.65 |
| Benzene solvent | 1,540 | |
| Chlorine added | ¹ 4.8 | ¹ 1.35 |

¹ That is 2.8%.

The resulting water-washed solution containing the stabilized, chlorinated butyl rubber "M" was then recovered by injecting the solution into an agitated aqueous slurry containing zinc stearate and a small amount of the nonionic wetting agent of the aliphatic polyoxyethylene ether type such as Tergitol NPX (e.g., Sterox AJ) in an amount of 0.7 pound of the zinc stearate per 100 pounds of chlorinated butyl rubber as a dispersing aid. The agitated solution was maintained at a temperature between about 190° and 210° F. (e.g., 200° F.) thereby to flash off the benzene solvent and form an aqueous slurry of the chlorinated butyl rubber in water. This slurry was then filtered and the chlorinated butyl rubber, which was in the form of a wet "crumb," was placed in a Proctor and Schwartz tray drier maintained at 180° F. (i.e., 82° C.) and dried for 12 hours. The crumb depth on the tray was about ½ inch. The crumb was then completely dried and compacted by milling for 15 minutes on a conventional rubber mill having a roll temperature of 260° F. (i.e., 127° C.).

Example 1

A chlorinated butyl rubber having a Mooney viscosity (212° F. for 8 minutes) of 58, a mole percent unsaturation of 0.90, a viscosity average molecular weight of 455,000, and containing 1.2 weight percent of combined chlorine was compounded into the following formulations and cured for 45 minutes at 307° F. with the resulting stress-strain data given hereinafter:

| Run | I | II |
|---|---|---|
| Component, parts by weight: | | |
| Chlorinated butyl rubber | 100 | 100 |
| HAF carbon black | 50 | 50 |
| Stearic acid | 1.0 | 1.0 |
| 2-mercapto-thiazoline | 5 | |
| Zinc 2-mercaptobenzothiazole | | 5 |
| Physical properties: | | |
| Modulus at 300% elongation, p.s.i. | 500 | 575 |
| Tensile strength, p.s.i. | 1,845 | 1,700 |
| Elongation, percent | 685 | 655 |

The above data show that mercaptobenzothiazole compounds cure chlorinated butyl rubber, in accordance with the present invention, into high quality vulcanizates.

Example 2

A brominated butyl rubber having a Mooney viscosity (212° F. for 8 minutes) of 66, a mole percent unsaturation of 0.71, a viscosity average molecular weight of 480,000, and containing 2.2 weight percent of combined bromine was compounded into the following formulations, cured at 307° F. for 45 minutes with the following physical inspections being noted:

| Run | III | IV | V | VI | VII |
|---|---|---|---|---|---|
| Component, parts by weight: | | | | | |
| Brominated butyl rubber | 100 | 100 | 100 | 100 | 100 |
| Stearic acid | 1 | 1 | 1 | 1 | 1 |
| HAF carbon black | 50 | 50 | 50 | 50 | 50 |
| 2-mercaptobenzothiazole | 5 | | | | |
| Di-2-benzothiazyl disulfide | | 5 | | | |
| 2-mercapto-thiazoline | | | 5 | | |
| Zinc 2-mercaptobenzothiazole | | | | 5 | |
| Cupric 2-mercaptobenzothiazole | | | | | 5 |
| Physical properties: | | | | | |
| Modulus at 300% elongation, p.s.i. | 610 | 540 | 990 | 820 | 400 |
| Tensile strength, p.s.i. | 1,145 | 1,520 | 2,640 | 1,940 | 1,125 |
| Elongation, percent | 635 | 725 | 610 | 565 | 750 |

The same general comments apply as in Example 1.

Example 3

The same general procedure as in Example 1 was repeated using various mercaptobenzothiazole derivatives as sole curatives for chlorinated butyl rubber with the following results:

| Run | VIII | IX | X | XI |
|---|---|---|---|---|
| Component, parts by weight: | | | | |
| Chlorinated butyl rubber | 100 | 100 | 100 | 100 |
| Stearic acid | 1 | 1 | 1 | 1 |
| HAF carbon black | 50 | 50 | 50 | 50 |
| Bismuth 2-mercaptobenzothiazole | 5 | | | |
| Iron 2-mercaptobenzothiazole | | 5 | | |
| Tin 2-mercaptobenzothiazole | | | 5 | |
| Chromium 2-mercaptobenzothiazole | | | | 5 |
| Physical properties: | | | | |
| Modulus at 300% elongation, p.s.i. | 610 | 475 | 740 | 365 |
| Tensile strength, p.s.i. | 1,665 | 1,370 | 1,850 | 1,240 |
| Elongation, percent | 675 | 720 | 605 | 815 |

The same general comments apply as in Example 1.

Example 4

The same general procedure as in Example 2 was repeated using various mercaptobenzothiazole derivatives as sole curing agents for brominated butyl rubber with the following results:

| Run | XII | XIII | XIV | XV | XVI | XVII |
|---|---|---|---|---|---|---|
| Component, parts by weight: | | | | | | |
| Brominated butyl rubber | 100 | 100 | 100 | 100 | 100 | 100 |
| Stearic acid | 1 | 1 | 1 | 1 | 1 | 1 |
| HAF carbon black | 50 | 50 | 50 | 50 | 50 | 50 |
| Lead 2-mercaptobenzothiazole | 5 | | | | | |
| Bismuth 2-mercaptobenzothiazole | | 5 | | | | |
| Iron 2-mercaptobenzothiazole | | | 5 | | | |
| Aluminum 2-mercaptobenzothiazole | | | | 5 | | |
| Tin 2-mercaptobenzothiazole | | | | | 5 | |
| Chromium 2-mercaptobenzothiazole | | | | | | 5 |
| Physical properties: | | | | | | |
| Modulus at 300% elongation, p.s.i. | 470 | 650 | 625 | 285 | 675 | 425 |
| Tensile strength, p.s.i. | 1,325 | 1,735 | 1,880 | 1,055 | 2,115 | 1,620 |
| Elongation, percent | 600 | 625 | 645 | 755 | 625 | 685 |

The same general comments apply as in Example 1.

Resort may be had to modifications and variations without departing from the spirit of the invention or the scope of the appended claims.

What is claimed is:

1. A composition comprising a major proportion of a rubbery halogenated copolymer of about 85 to 99.5 weight percent of a $C_4$ to $C_7$ isoolefin and about 15 to 0.5 weight percent of a $C_4$ to $C_{14}$ multiolefin, said copolymer containing a halogen selected from the group consisting of chlorine and bromine, and a minor proportion sufficient to vulcanize the composition upon heating of a curative consisting of a mercaptobenzothiazole compound, said composition being free of added elemental sulfur and metal oxides, the proportion of mercaptobenzothiazole compound falling within the range of about 0.1 to 30 weight percent based on halogenated copolymer.

2. A composition according to claim 1 in which the halogenated copolymer contains at least 0.5 weight percent chlorine but not more than about one atom of chlorine per double bond in the copolymer.

3. A composition according to claim 1 in which the halogenated copolymer contains at least about 0.5 weight percent bromine but not more than about three combined atoms of bromine per double bond in the copolymer.

4. A composition according to claim 1 containing about 20 to 100 parts by weight per 100 parts by weight of copolymer of a carbon black.

5. A composition according to claim 1 in which the halogenated copolymer is selected from the group consisting of chlorinated butyl rubber and brominated butyl rubber, butyl rubber being a copolymer of 85 to 99.5 wt. percent of a $C_4$ to $C_7$ isoolefin and 15 to 0.5 wt. percent of a $C_4$ to $C_{14}$ multiolefin.

6. A composition according to claim 1 in which the mercaptobenzothiazole compound comprises 2-mercaptobenzothiazole.

7. A composition according to claim 1 in which the mercaptobenzothiazole compound comprises a metal salt of mercaptobenzothiazole.

8. A composition according to claim 1 in which the mercaptobenzothiazole compound comprises di-2-benzothiazyl disulfide.

9. A composition according to claim 1 in which the mercaptobenzothiazole compound consists of a member selected from the group consisting of mercaptobenzothiazole; groups I, II, III, IV, V, VI and VIII metal salts of mercaptobenzothiazole; dibenzothiazyl disulfide; heterocyclic derivatives of mercaptobenzothiazole; and mixtures thereof.

10. A composition according to claim 1 which has been vulcanized by heating the same for between about 0.5 minute and 5 hours at a temperature level of between about 100° and 450° F. to produce a vulcanizate having a high tensile strength, extension modulus and elongation.

11. A composition comprising 100 parts by weight of a rubbery polymer having a viscosity average molecular weight of at least about 100,000 comprising atoms of hydrogen, carbon and a halogen selected from the group consisting of bromine and chlorine, containing in its structure a major proportion of hydrocarbon units derived by the polymerization of isoolefins containing about 4 to 7 carbon atoms and also containing sufficient units in which a pair of carbon atoms is linked by an olefinic double bond that the mole percent unsaturation is between about 0.5 and 15; said polymer containing at least about 0.5 weight percent halogen but not more than about three combined atoms of halogen per double bond in the polymer; said polymer being in composition with about 0.1 to 30 parts by weight of a curative consisting of a mercaptobenzothiazole compound; said composition being free of added elemental sulfur and metal oxides.

12. A composition according to claim 11 in which the polymer contains chlorine in an amount of not more than one atom per double bond.

13. A composition according to claim 11 in which the polymer contains bromine in an amount of not more than 2 atoms per double bond.

14. A composition according to claim 11 in which the mercaptobenzothiazole compound is present in an amount of between about 0.3 and 20 weight percent based on the halogen-containing polymer.

15. A process which comprises vulcanizing halogenated butyl rubber in the absence of added elemental sulfur with about 0.1 and 30.0 weight percent of a curative consisting of a mercaptobenzothiazole compound at a temperature level of between about 150° and 450° F., butyl rubber being a copolymer of 85 to 99.5 wt. percent of a $C_4$ to $C_7$ isoolefin and 15 to 0.5 wt. percent of a $C_4$ to $C_{14}$ multi-olefin.

16. A process according to claim 15 in which the halogenated butyl rubber contains chlorine.

17. A process according to claim 15 in which the halogenated butyl rubber contains bromine.

References Cited in the file of this patent

UNITED STATES PATENTS

| | | |
|---|---|---|
| 2,631,984 | Crawford et al. | Mar. 17, 1953 |
| 2,732,354 | Morrissey et al. | Jan. 4, 1956 |